United States Patent [19]

Moe

[11] Patent Number: 4,736,084
[45] Date of Patent: Apr. 5, 1988

[54] METHOD AND APPARATUS FOR HEATING OPPOSING SURFACES OF TWO ELEMENTS TO BE JOINED

[76] Inventor: Per H. Moe, Amtmann Bangsgt. 7, N-3000 Drammen, Norway

[21] Appl. No.: 908,813
[22] PCT Filed: Dec. 27, 1985
[86] PCT No.: PCT/NO85/00082
  § 371 Date: Aug. 14, 1986
  § 102(e) Date: Aug. 14, 1986
[87] PCT Pub. No.: WO86/04005
  PCT Pub. Date: Jul. 17, 1986

[30] Foreign Application Priority Data

Jan. 4, 1985 [NO] Norway .................... 850049

[51] Int. Cl.⁴ ............................................. B23K 11/00
[52] U.S. Cl. .................................. 219/61.2; 219/8.5; 219/105
[58] Field of Search ................... 219/61.2, 8.5, 105

[56] References Cited

U.S. PATENT DOCUMENTS

| | | | |
|---|---|---|---|
| 2,021,157 | 11/1935 | Stahl | 219/105 |
| 2,066,668 | 1/1937 | Bennett | 219/8.5 |
| 2,542,393 | 2/1951 | Chapman | 219/8.5 |
| 2,629,805 | 2/1953 | Body | 219/8.5 |
| 2,805,315 | 9/1957 | Chapman | 219/8.5 |
| 3,619,548 | 11/1971 | Cavagnero | 219/105 |
| 4,241,284 | 12/1980 | Rudd et al. | 219/61.2 |

Primary Examiner—Clifford C. Shaw
Attorney, Agent, or Firm—Darby & Darby

[57] ABSTRACT

In a method for heating metal elements (1,2) which are to be joined, for example by forge welding, there is used a high frequency resistance heating. The elements are provided with surfaces to be welded and are positioned so that said surfaces constituted a narrow gap (3). The current is conducted from a high frequency current source (11) through a contact (9) into one of the elements (1), wherefrom the current follows the material close to the gap surface (4) and to the opposite side of the element, where the current flows via further contacts (8,9) and a conductor (10) to the other element (2). From here the current follows the other gap surface (5) to another contact (7) and the current source (11). The current will follow a path close to the gap surfaces since these surfaces will give the path of smallest total impedance, the current thereby establishing a narrow and efficient heating zone in the vicinity of said gap surfaces.

6 Claims, 2 Drawing Sheets

METHOD AND APPARATUS FOR HEATING OPPOSING SURFACES OF TWO ELEMENTS TO BE JOINED

FIELD OF THE INVENTION

The present invention relates to a method for heating metal elements to be joined, especially by forge welding, in which the elements are provided with surfaces to be welded and are positioned so that said surfaces constitute a narrow gap, and in which the heating takes place by means of a high frequency current supplied from a power source of alternating current.

PRIOR ART

From for example Norwegian Patent Application No. 83.3729 there is known a method for joining parts of metal by forge welding, in which the parts prior to the forge welding are heated be means of an induction coil.

In order to provide an efficient joining of said parts, it is of great importance that the heating is concentrated as much as possible in the area of the joint. If the heat is allowed to spread too far from the joint, the heating time will increase, the bending force of the parts will be reduced during the forge welding, the favourable tri-axial stress conditions will be worse and the necessity of heat treatment after the completed welding will increase.

Heating of pipe parts by means of induction heating prior to the joining of said parts, has been suggested and tested by many, but the practical application has been very limited, the heating zone having a tendency to be too long. The heat from the coil must be transferred to the metal parts closest to the coil and must spread therefrom and into the joint surfaces, a fact which entails that improper zones of the metal will be heated.

If the cross section of the material is reduced in the area of the joint for achieving higher tri-axtial tensions during the forging operation, it will be difficult to position the induction coil as close to the joint that heating will only take place in the area of the joint.

From DE Auslegeschrift No. 15 65 360 there is known a device for continuous electric welding of profiled parts. The device includes connections for two or more V-shaped gaps which are simultaneously and continuously welded in the longitudinal direction of the profiled parts by means of the same high frequency power source. However no instruction is given therein about a heating process relating to the area of a narrow gap which is kept substantially constant during the heating process.

From DE Offenlegungsschrift No. 30 07 153 there is known a method for continuous seam welding of pipes by means of high frequency welding, in which method the current is utilized in a better way by including an additional coil for the regulation of the primary high frequency current. However, the method includes the use of a sliding contact system for achieving the continuous welding of longitudinally extending seams, but this technique cannot be transferred to a butt welding of pipes and bolts, which is the case with the present invention.

From U.S. Pat. No. 2,892,914 there is known a method and an apparatus for butt welding based on induction heating, but this known technique has found no practicle application due to the fact that no concentrated heating zone can be achieved in the area of the joint. Further, no gap between the two metal parts to be joined is suggested in U.S. Pat. No. 2,892,914, let alone that the known technique suggests inclined or sloped areas bordering the gap. Due to the lack of a gap between the parts to be joined, the prior art does not allow for flushing the surfaces of the end faces to be joined.

SUMMARY OF THE INVENTION

The object of the present invention is to provide a method for heating metal elements to be joined, which more rapidly and efficiently establishes a concentrated heating zone in the area contstiting the gap surfaces of the elements to be welded.

Suprisingly, it has been found that a high frequency current source can be utilized in a manner rendering a quicker and more concentrated heating zone than by induction heating.

The abovementioned object is achieved in connection with a method which is the two poles of the power source are connected galvanically to each element, respectively, close to the gap surfaces, and that said elements are connected galvanically across said narrow gap preferably at the opposite side of the power source connections, so as to establish a high frequency resistance paths in the area of said gap surfaces for heating said elements in a narrow zone including said gap surfaces.

Thus, there is established a high frequency resistance heating of said elements right out to the gap surfaces. The reason why the current follows the gap surfaces is meant to relate to the fact that the high frequency current does not choose the path of less ohmic resistance, but the path given the lowest total impedance. Consequently it is important that the gap surfaces are positioned close to each other, but without being in physical contact with each other.

By welding a pipe having a wall thickness of 2.5 cm or more, the method according to the present invention is four to five times more effective than a method based on high frequency induction welding. It is presumed that welding can be completed for very large pipes within approximately 1 minute without normalizing. Further, the method according to the present invention includes the advantages of being applicable for all types of metals.

According to a preferred embodiment of the invention two contacts are attached, one on each of the elements, close to the gap and close to each other, and the two elements are connected by means of further contacts and a conductor at the opposite side of the elements, whereafter aternating current is supplied to the two first mentioned contacts.

Preferably, the contacts are clamped onto the respective elements, but can also be attached in another suitable manner. The contacts and possibly the conductor can appropriately be cooled, preferably be means of water.

For a better understanding of the present invention this will be further discussed with reference to the embodiment which is diagrammatically illustrated on the attached drawings.

DETAILED DESCRIPTION

Figure 1:
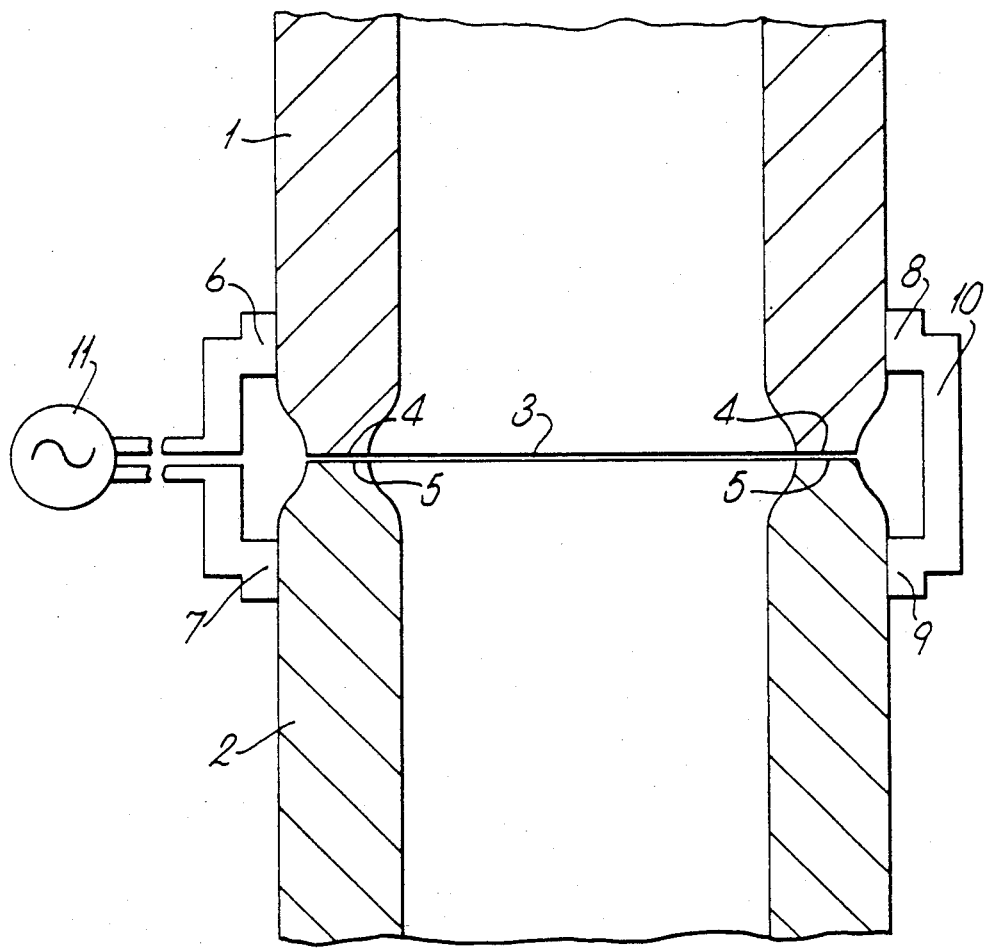
FIG. 1 is a section through two pipe elements to be welded according to the present invention.

FIG. 1 depicts a section through two pipe parts 1, 2 which are so positioned relative to each other that a gap 3 is established therebetween. The gap is defined by gap surfaces 4 and 5 on the individual pipe parts 1 and 2 respectively. The gap surfaces are positioned very close to each other but have no physical contact.

A contact 6 is in a suitable manner attached to the pipe part 1, whereas a contact 7 is attached to the pipe part 2. These contacts can for example be clamped onto the pipe parts. On the diametrically opposite side of the contacts 6 and 7, there are to the pipe parts attached contacts 8 and 9, for example by soldering. The contacts 8 and 9 are connected by means of a conductor 10. The contacts 6 and 7 are in turn connected to a high frequency alternating current source 11.

If the path of the current is followed during a half cycle, the current will for example flow through the contact 6 into the pipe part 1. From here it will pass down to the gap surface 4 and therealong to the diametrically opposite side of the pipe part 1. From there it will flow to the contact 8, down through the conductor 10 and in through the contact 9 in the pipe part 2. From there it will in a corresponding manner flow to the gap surface 5 and there along to the diametrically opposite side, whereupon it flows out through the contact 7 and back to the current source 11. The fact that the current follows the gap surfaces 4 and 5 very accurately, results in that the resistance heating takes place just at the desired locations. Besides, the heating takes place so rapidly that the heat only to a smaller degree will have time to spread outwardly in the pipe parts before the temperature in the joint area has become so high that forge welding can be effected.

Because the gap surfaces 4 and 5 do not touch each other, it is to be understood that the gap 3 can be flushed with a reducing gas during the heating.

It is to be understood for the artisan that the invention can find a favourable application beyond the welding of coarse pipes. Thus, the invention is not limited to the illustrated embodiment, but can be varied and modified in several manners within the scope of the attached claims. The gap surfaces can for example be shaped so that they diverge somewhat relative to each other in an inwardly radial direction. This is especially favourable in connection with welding of solid parts, such as rods or bolts. Thus if the gap surfaces of the rods or bolts to be joined are given a somewhat curved shape, which involves that the current will not follow the shortest path across the gap surface between the contacts, but rather spread out over the gap surfaces for heating said surfaces all over. It appears that the higher the frequency of the alternating current is, the less the gap surfaces have to deverge to secure a sufficient distribution of the current for heating purposes.

Figure 2:
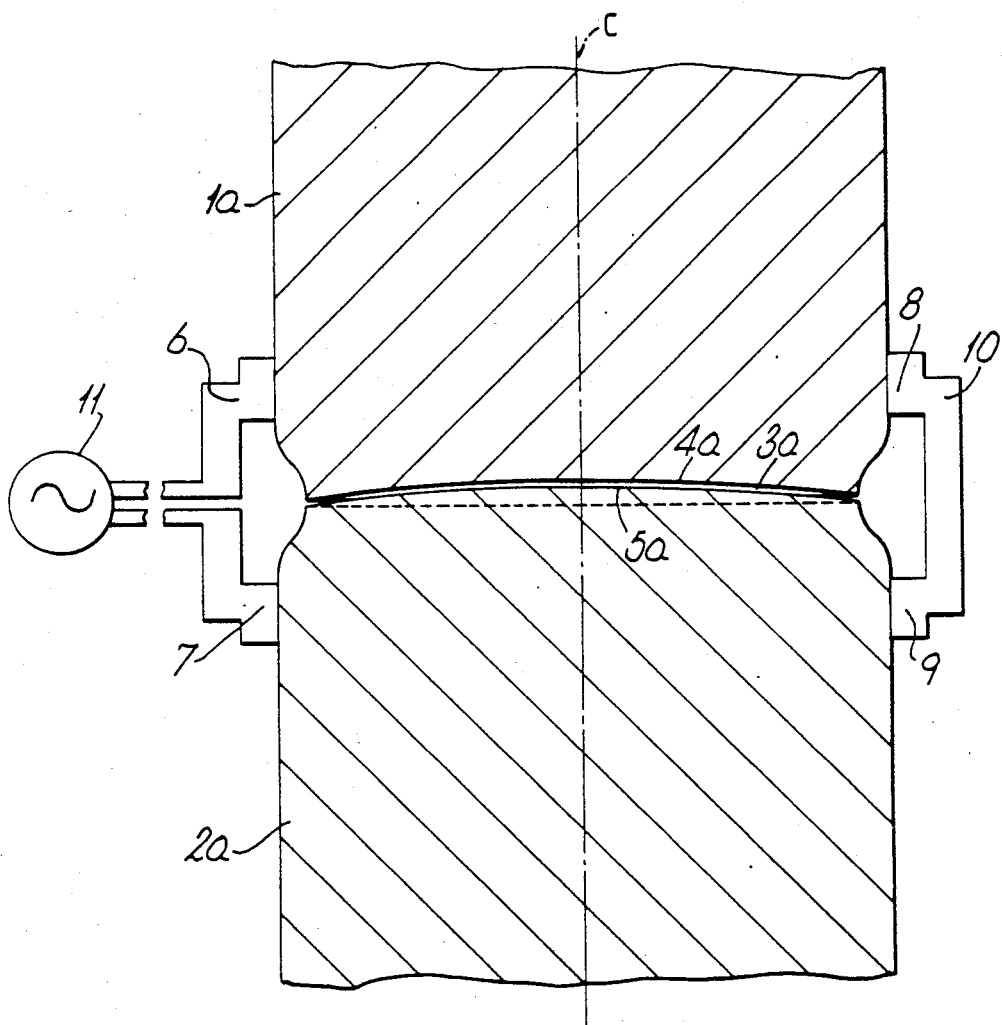
FIG. 2 is a section through two bolt elements to be welded according to the present invention.

In FIG. 2 it is illustrated how the gap surfaces 4a and 5a defining the gap 3a between two solid bolt elements 1a and 2b to be joined, have been given a slightly curved shape. The curvature of the gap surfaces allows for a larger distance between the gap surfaces in the area of the common longitudinal axis C of the two elements. Whereas the distance therebetween becomes smaller closer to the peripheral areas of said surfaces.

This variation in distance between the surfaces gives a favourable current distribution across the two gap surfaces, so as to allow for a uniform and concentrated heating thereof.

Because the surfaces 4a and 5a are curved in opposite directions they allow for a favourable guidance of the elements when they are pressed together to form a welding joint.

It is to be understood that the Figures illustrate the two parts or elements to be joined immediately before welding, and that after sufficient heating and possible flushing of the joint or gap 3 or 3a, the elements are pressed together for closing the joint 3 or 3a so as to form a pocket free final welding joint.

As it is seen from the Figure the elements 1 and 2 have been given a reduced cross section in the area of the joint. This is done in order to more easily obtain a triaxial stress condition in the joint area when the material, during the pressing together of said elements, is subjected to a floating condition due to the concentrated heating of the gap surfaces. The floating conditions of the material during the forge welding operation can be regarded as subjecting the material in the joint area to a load which is 2 to 3 times larger than the plastic yielding of the material.

I claim:

1. A method for heating metal elements having opposing surfaces to be joined such as by forge welding comprising the steps of:
    shaping the opposing surfaces of the elements to be welded to extend in non-parallel directions and to define a gap whose spacing varies from a minimum to a maximum dimension along a predetermined distance which is generally transverse to the gap;
    electrically connecting one pole of a source of high frequency alternating current to each element at a point close to the gap surface, and making an electrical connection to said two elements across said gap at points remote from said two poles of said current source to complete the electrical current conducting path and form a high frequency resistance path in the area of the gap surfaces;
    applying current from said current source to said elements while holding said elements with the varying gap spacing stationary;
    the shape of said elements' surfaces and the opposing variable gap spacing aiding in more evenly distributing the lines of force produced by the current in the high frequency resistance path of each element.

2. A method as in claim 1 wherein the step of making the electrical connection comprises electrically connecting a current carrying bridge to each of said elements across said gap at points on said elements substantially diametrically opposite to said poles of said current supply.

3. A method as in claim 2 further comprising the step of applying a cooling fluid to said poles of said current supply attached to said elements and to said bridge.

4. A method as in claim 1 further comprising the step of applying a cooling fluid to said poles of said current supply attached to said elements.

5. A method as in claim 1 wherein said opposing surfaces are shaped to permit the two surfaces to be pressed together, and pressing said surfaces together after the heating step.

6. The combination for heating pipe-shaped or rod-shaped metal elements of a workpiece to be joined, such as by force welding comprising:
    a workpiece formed by two surfaces which are to be joined facing each other and extending in non-parallel directions to define a gap whose spacing varies from a minimum to a maximum dimension along a predetermined distance which is generally transverse to the gap;

means for having two output poles for supplying a high frequency alternating current;

means for connecting one of the poles of the current supply means to each element at a point close to the gap surfaces and means for making an electrical connection to said two elements across said gap at points remote from said two poles to complete the electrical current conducting path and form a high frequency resistance path in the area of the gap surfaces;

means for holding said surfaces defining said gap stationary during the application of the high frequency alternating current to said elements;

the shape of said elements' surfaces and the opposing variable gap spacing aiding in more evenly distributing the lines of force produced by the current in the high frequency resistance path of each element.

* * * * *